(12) United States Patent
Zhang (10) Patent No.: US 11,346,274 B1
(45) Date of Patent: May 31, 2022

(54) METHODS AND SYSTEMS FOR PRECHAMBER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/206,773

(22) Filed: Mar. 19, 2021

(51) Int. Cl.
| F02B 19/16 | (2006.01) |
| F02D 13/02 | (2006.01) |
| F02B 23/10 | (2006.01) |

(52) U.S. Cl.
CPC .............. *F02B 19/16* (2013.01); *F02B 23/10* (2013.01); *F02D 13/0234* (2013.01); *F02B 2023/108* (2013.01)

(58) Field of Classification Search
CPC .... F02B 19/16; F02B 23/10; F02B 2023/108; F02D 13/0234
USPC ........................................................ 123/253
See application file for complete search history.

(56) References Cited

U.S. PATENT DOCUMENTS

| 3,722,480 | A | * | 3/1973 | Berkowitz | .............. | F02B 53/12 |
| | | | | | | 123/210 |
| 4,416,228 | A | * | 11/1983 | Benedikt | ................. | F02B 19/12 |
| | | | | | | 123/268 |
| 4,513,708 | A | * | 4/1985 | Latsch | ..................... | H01T 13/54 |
| | | | | | | 123/263 |
| 4,542,724 | A | * | 9/1985 | Blais | ................... | F02B 19/1004 |
| | | | | | | 123/266 |
| 4,892,070 | A | * | 1/1990 | Kuhnert | .................. | H01T 13/54 |
| | | | | | | 123/274 |
| 5,555,867 | A | | 9/1996 | Freen | | |
| 6,854,439 | B2 | * | 2/2005 | Regueiro | ................ | F02B 19/18 |
| | | | | | | 123/263 |
| 8,324,792 | B2 | * | 12/2012 | Maul | ....................... | H01T 13/54 |
| | | | | | | 313/141 |
| 9,476,347 | B2 | | 10/2016 | Chiera et al. | | |
| 2007/0151540 | A1 | * | 7/2007 | Takahashi | ............... | F02B 19/12 |
| | | | | | | 123/267 |
| 2019/0284988 | A1 | | 9/2019 | Anderson et al. | | |
| 2020/0240321 | A1 | * | 7/2020 | Bertsch | .................... | F02B 19/18 |
| 2020/0332705 | A1 | | 10/2020 | Han et al. | | |
| 2020/0386147 | A1 | * | 12/2020 | Bertsch | .................... | F02B 19/18 |

FOREIGN PATENT DOCUMENTS

| CN | 108291475 B | 10/2020 |
| DE | 102013210125 B4 | 12/2014 |
| EP | 0338882 A1 | 10/1989 |
| WO | 2020127234 A1 | 6/2020 |

* cited by examiner

*Primary Examiner* — Mahmoud Gimie
(74) *Attorney, Agent, or Firm* — Geoffrey Brumbaugh; McCoy Russell LLP (57) ABSTRACT

Methods and systems are provided for a prechamber. In one example, a system includes a plurality of openings angularly arranged in a prechamber wall. The plurality of openings is oriented to receive and expel fluids in clockwise or counterclockwise directions.

20 Claims, 5 Drawing Sheets

METHODS AND SYSTEMS FOR PRECHAMBER

FIELD

The present description relates generally to a prechamber of an engine.

BACKGROUND/SUMMARY

Engines have in the past utilized prechamber combustion to increase combustion efficiency and correspondingly reduce emissions. Prechamber combustion systems may include an auxiliary prechamber above or within the main combustion chamber with an ignition device and fuel injector coupled to the auxiliary prechamber. In such systems, combustion unfolds in the following sequence; (i) a small amount of fuel is directly injected into the prechamber, (ii) spark is provided to the air/fuel mixture in the prechamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ prechamber schemes.

In some prechambers, issues may arise from residual gases from a previous combustion cycle being present in an interior volume of the prechamber. The residual gases may block an air/fuel mixture from within the combustion chamber to flow into the prechamber, and thus, may not be exposed to an ignition device arranged therein. One approach to solve this issue is to include an auxiliary air pump configured to clear the residual gases prior to combustion.

However, the inventors have identified some issues with the approaches described above. For example, the auxiliary air pump increases a packaging size of the prechamber while also further complicating routines thereof. Additionally, cold-start emissions associated with unburned fuel may not be reduced.

In one example, the issues described above may be addressed by system for a prechamber comprising a plurality of openings extending through a prechamber wall, wherein a length of each of the plurality of openings is greater than a thickness of the prechamber wall. In this way, features of the prechamber are modified to remove residual gases from an interior volume of the prechamber.

As one example, a controller may include instruction on memory that when executed enable the controller to adjust an intake valve operation during conditions where residual gases may be present in the prechamber. The intake valve operation may be adjusted to generate a swirl within a main combustion chamber. A direction of the swirl may be similar to an orientation of the plurality of openings. Intake air may enter the interior volume of the prechamber and sweep residual gases from therein through a central opening of the prechamber and into the main combustion chamber. By doing this, combustion conditions may be enhanced and emissions may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
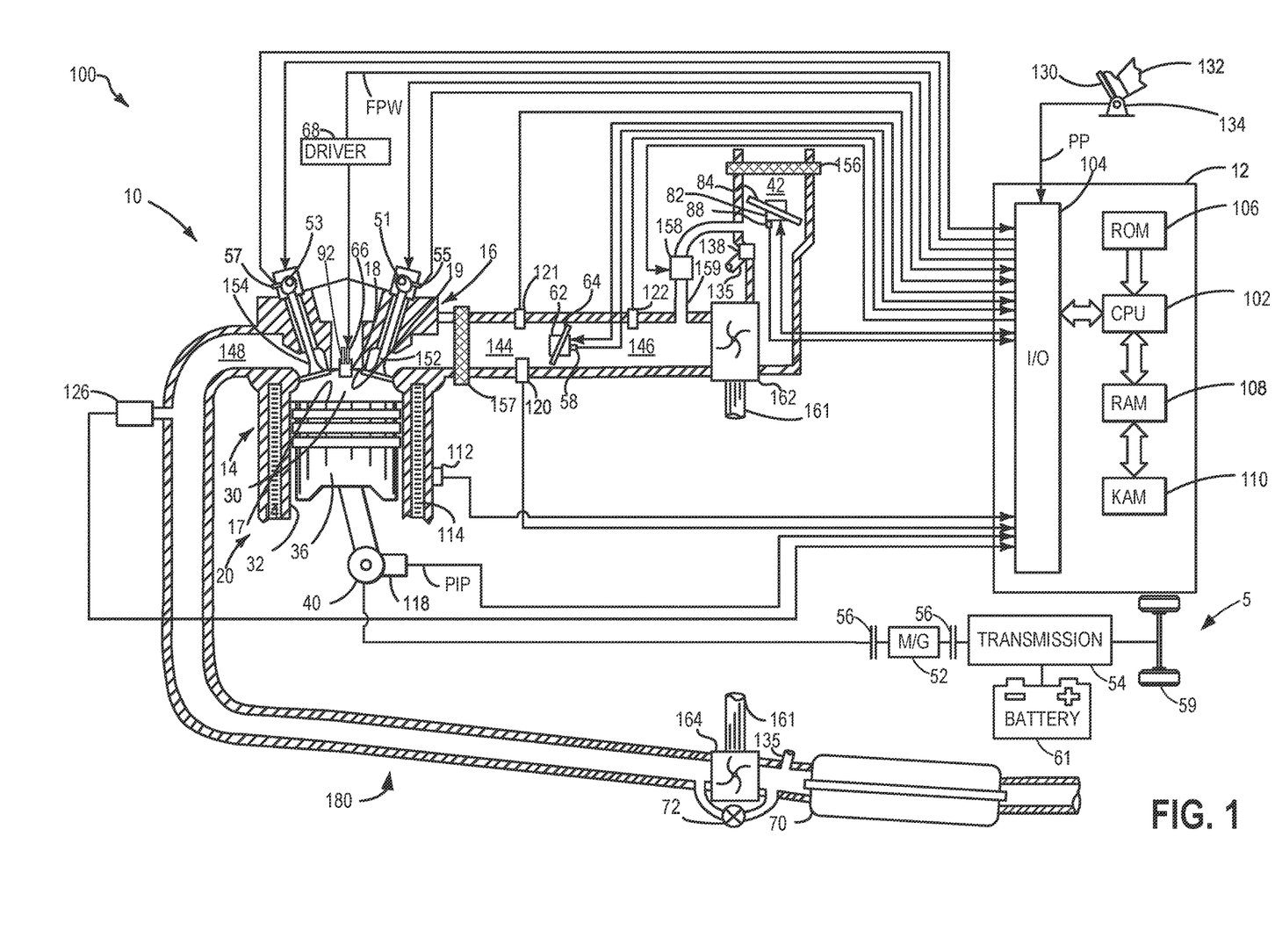
FIG. 1 illustrates a schematic of an engine included in a hybrid vehicle.
Figure 2A:
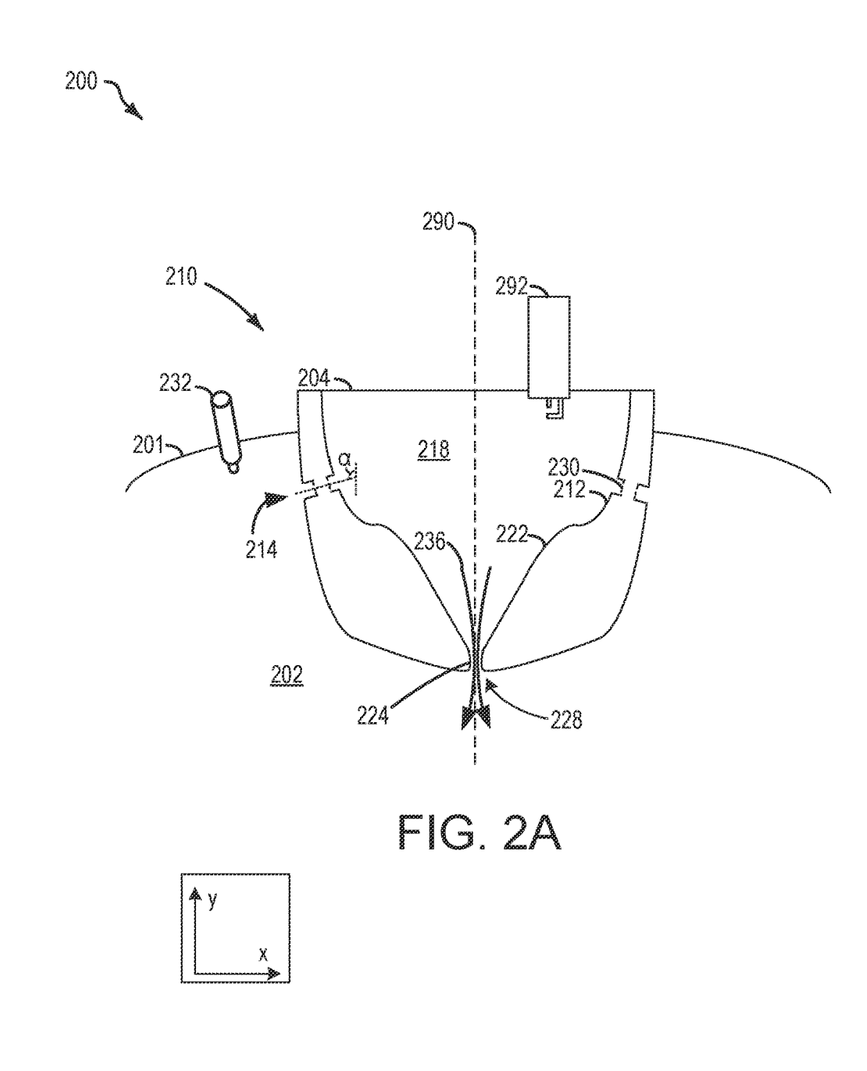
FIG. 2A illustrates a first cross-sectional view of a prechamber arranged in a main combustion chamber of the engine.
Figure 2B:
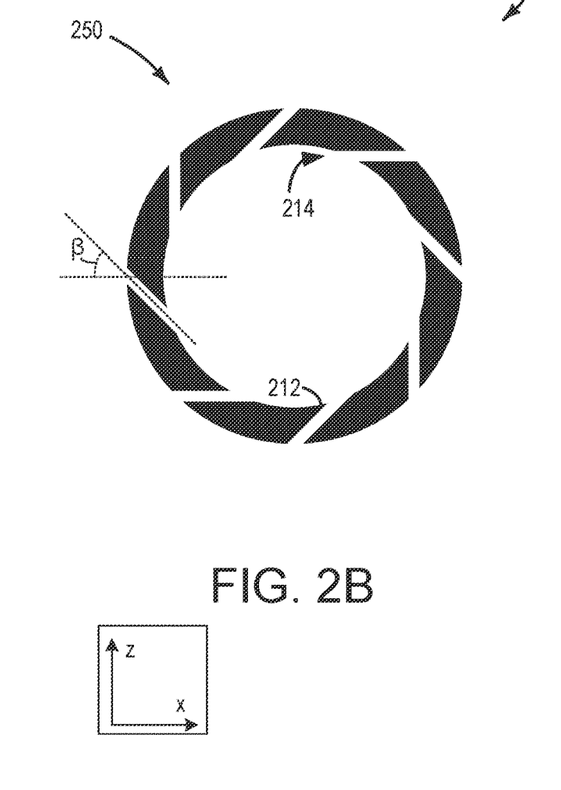
FIG. 2B illustrates a second cross-sectional view illustrating a plurality of openings of the prechamber.

The following description relates to systems and methods for a prechamber. The prechamber may be arranged in a combustion chamber of an engine, as illustrated in the example of FIG. 1. Detailed cross-sectional views of the prechamber are illustrated in FIGS. 2A and 2B.

Figure 3A:
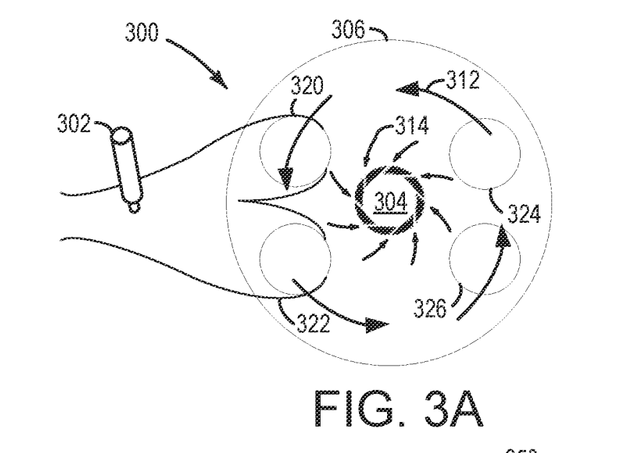
FIGS. 3A, 3B, and 3C illustrate example fluid flows through the prechamber during intake, expansion, and exhaust strokes, respectively.
Figure 3B:
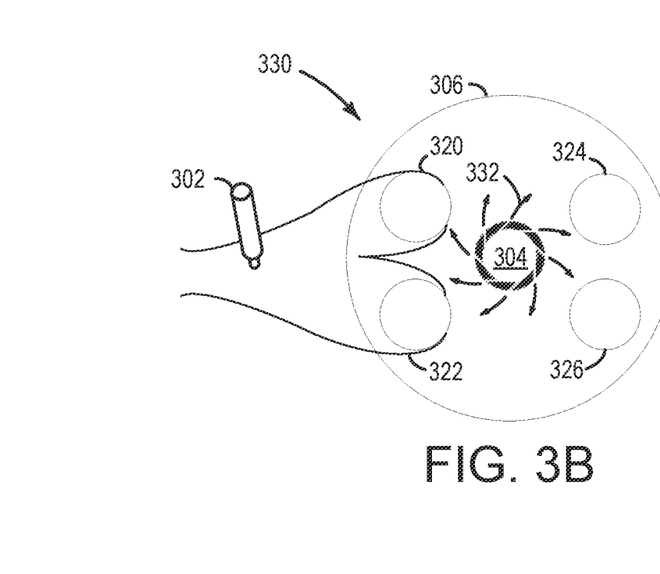
Figure 3C:
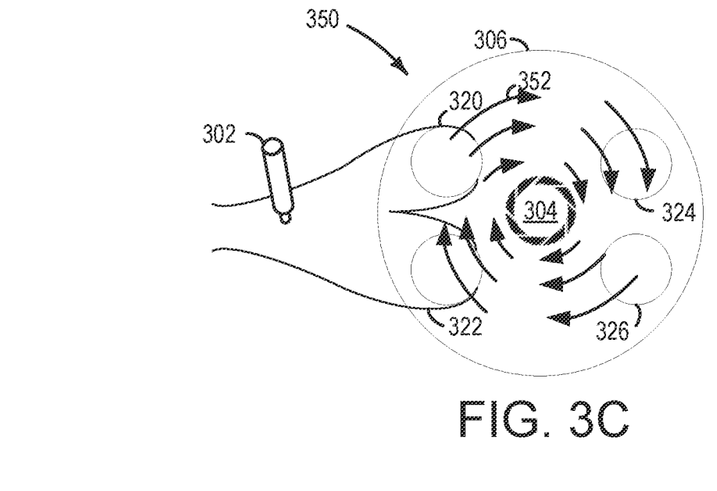
Figure 4:
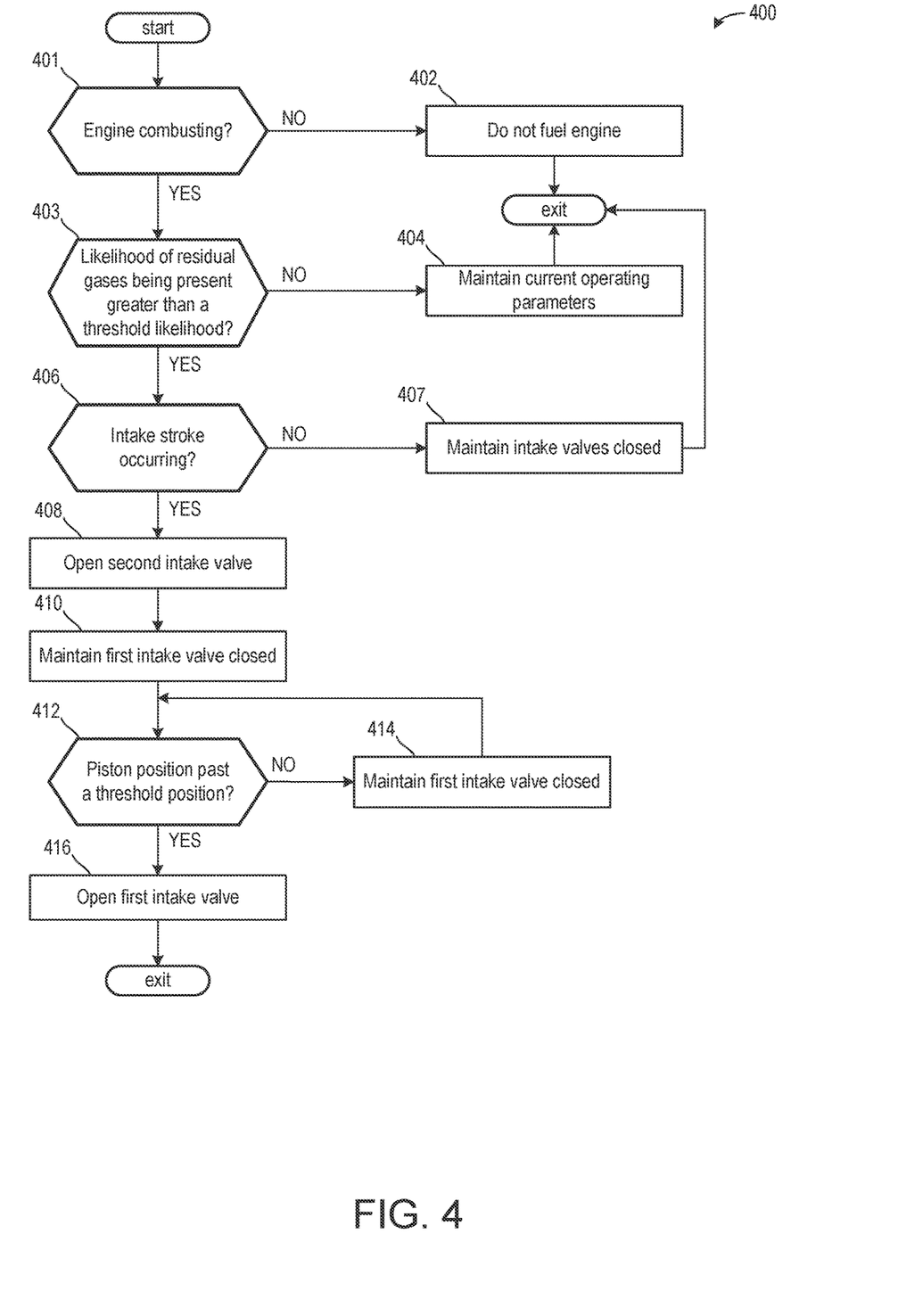
FIG. 4 illustrates a method for adjusting intake valve operation.
Figure 5:
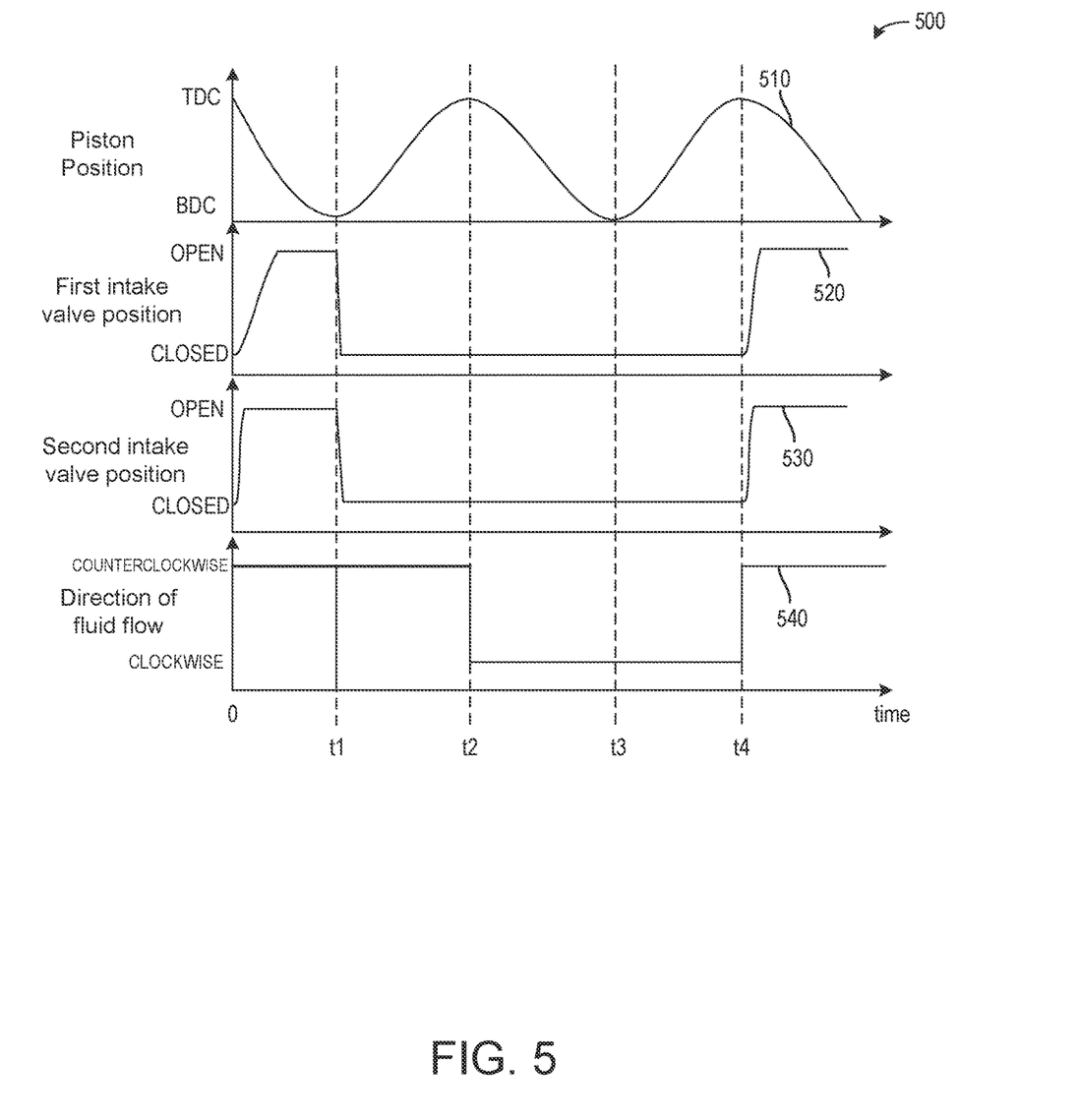
FIG. 5 graphically illustrates a prophetic engine operating sequence illustrating adjustments to one or more engine operating parameters during a combustion cycle.

Example flows in and out of the prechamber during an intake stroke, an expansion stroke, and an exhaust stroke are illustrated in FIGS. 3A, 3B, and 3C, respectively. A method for operating intake valves is shown in FIG. 4. A graphical illustration of the method of FIG. 4 is shown in FIG. 5.

FIGS. 1, 2A, 2B, 3A, 3B, and 3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components lying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20 and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. The cylinder bore 20 may be defined as the volume enclosed by the cylinder walls 32. The cylinder head 16 may be coupled to the cylinder block 14 to enclose the cylinder bore 20. Thus, when coupled together, the cylinder head 16 and cylinder block 14 may form one or more combustion chambers. In particular, combustion chamber 30 may be the volume included between a top surface 17 of the piston 36 and a fire deck 19 of the cylinder head 16. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electro-mechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be couples to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

A prechamber 18 is located within the cylinder head 16 of the combustion chamber 30. Specifically, the prechamber 18 is arranged within the cylinder head 16 and may house each of an ignition device 92 and an injector 66. In such an example, the prechamber 18 may be an active prechamber. Additionally or alternatively, the injector 66 may be positioned to inject directly into the combustion chamber 30 or into an intake port corresponding to the intake valve 152. Thus, the prechamber 18 may also be configured as a passive prechamber without departing from the scope of the present disclosure. The prechamber 18 may extend into the combustion chamber 30 and fluidly couple thereto via a plurality of openings arranged in a body of the prechamber 18.

The cylinder walls 32, piston 36, and cylinder head 16 may this form the combustion chamber 30, where a top surface 17 of the piston 36 serves as the bottom wall of the combustion chamber 30 while an opposed surface or fire deck 19 of the cylinder head 16 forms the top wall of the combustion chamber 30. Thus, the combustion chamber 30 may be the volume included within the top surface 17 of the piston 36, cylinder walls 32, and fire deck 19 of the cylinder head 16.

Fuel injector 66 may be positioned to inject fuel directly into an interior volume of the prechamber 18. Fuel injector 66 delivers liquid fuel in proportion to the pulse width of FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a diesel engine, and the fuel tank may include diesel fuel, which may be injected by injector 66 into the prechamber 18. However, in the example of FIG. 1, the engine 10 is a gasoline engine, with an ignition device 92 arranged within the prechamber 18 adjacent to the fuel injector 66.

Intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to an air intake passage 42 and located upstream of the intake boost chamber 146. In yet further examples, throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air. In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40 may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted air charge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Emission control device 70 may be a catalytic converter and as such may also be referred to herein as catalytic converter 70. Alternatively, a two-state exhaust gas oxygen sensor may be substituted for UEGO sensor 126. Catalytic converter 70 can include multiple catalyst bricks, in one example. In another example, multiple emission control devices, each with multiple bricks, can be used. Catalytic converter 70 can be a three-way type catalyst in one example. While the depicted example shows UEGO sensor 126 upstream of turbine 164, it will be appreciated that in alternate embodiments, UEGO sensor 126 may be positioned in the exhaust manifold downstream of turbine 164 and upstream of catalytic converter 70.

During the combustion cycle, each cylinder within engine 10 may undergo a four stroke cycle including: an intake stroke, a compression stroke, a power stroke, and an exhaust stroke. During the intake stroke and power stroke, the piston 36 moves away from the cylinder head 16 towards a bottom of the cylinder increasing the volume between the top of the piston 36 and the fire deck 19. The position at which piston 36 is near the bottom of the cylinder and at the end of its intake and/or power strokes (e.g., when combustion chamber 30 is at its largest volume) is typically referred to by those of skill in the art as bottom dead center (BDC). Conversely, during the compression and exhaust strokes, the piston 36 moves away from BDC towards a top of the cylinder (e.g., fire deck 19), thus decreasing the volume between the top of the piston 36 and the fire deck 19. The position at which piston 36 is near the top of the cylinder and at the end of its compression and/or exhaust strokes (e.g., when combustion chamber 30 is at its smallest volume) is typically referred to by those of skill in the art as top dead center (TDC). Thus, during the intake and power strokes, the piston 36 moves from TDC to BDC, and during the compression and exhaust strokes, the piston 36 moves from BDC to TDC.

Further, during the intake stroke, generally, the exhaust valves 154 close and the intake valves 152 open to admit intake air into the combustion chamber 30. Intake valve operation may be adjusted during some conditions. In some examples, the intake valve 152 may be one or a plurality of intake valves, wherein opening times of the intake valves may be adjusted to modify intake air flow into the combustion chamber 30. During the compression stroke, both valves 152 and 154 may remain closed, as the piston 36 compresses the gas mixture admitted during the intake stroke. During the compression stroke, gases in the combustion chamber 30 may be pushed into the prechamber 18 due to positive pressure created by the piston 36 as it travels towards the prechamber 18.

When the piston 36 is near or at TDC during the compression and/or power stroke, fuel is injected by injector 66. During the ensuing power stroke, the valves 152 and 154 remain closed, as the expanding and combusting fuel and air mixture pushes the piston 36 towards BDC. In some examples, fuel may be injected prior to the piston 36 reaching TDC, during the compression stroke. However, in other examples, fuel may be injected when the piston 36 reaches TDC. In yet further examples, fuel may be injected after the piston 36 reaches TDC and begins to translate back towards BDC during the power stroke. In yet further examples, fuel may be injected during both the compression and power strokes.

Fuel may be injected over a duration. An amount of fuel injected and/or the duration over which fuel is injected may be varied via pulse width modulation (PWM) according to one or more linear or non-linear equations. Further, the injector 66 may include a plurality of injection orifices, and an amount of fuel injected out of each orifice may be varied as desired.

During the exhaust stroke, the exhaust valves 154 may open to release the combusted air-fuel mixture to exhaust manifold 148 and the piston 36 returns to TDC. Exhaust gases may continue to flow from the exhaust manifold 148, to the turbine 164 via exhaust passage 180.

Both the exhaust valves 154 and the intake valves 152 may be adjusted between respective closed first positions and open second positions. Further, the position of the valves 154 and 152 may be adjusted to any position between their respective first and second positions. In the closed first position of the intake valves 152, air and/or an air-fuel mixture does not flow between the intake manifold 144 and the combustion chamber 30. In the open second position of the intake valves 152, air and/or an air-fuel mixture flows between the intake manifold 144 and the combustion chamber 30. In the closed second position of the exhaust valves 154, air and/or an air-fuel mixture does not flow between the combustion chamber and the exhaust manifold 148. However, when the exhaust valves 154 are in the open second position, air and/or an air-fuel mixture may flow between the combustion chamber and the exhaust manifold 148.

Note that the above valve opening and closing schedule is described merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114, a position sensor 134 coupled to an input device 130 for sensing input device pedal position (PP) adjusted by a vehicle operator 132, a measurement of engine manifold pressure (MAP) from pressure sensor 121 coupled to intake manifold 144, a measurement of boost pressure from pressure sensor 122 coupled to boost chamber 146; an engine position sensor from a Hall effect sensor 118 sensing crankshaft 40 position, a measurement of air mass entering the engine from sensor 120 (e.g., a hot wire air flow meter), and a measurement of throttle position from sensor 58. Barometric pressure may also be sensed (sensor not shown) for processing by controller 12. In an aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicles 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

In some examples, additionally or alternatively, the turbine 164 may be omitted and the compressor 162 may be configured as a supercharger driven via the battery 61. As such, the compressor 162 may be activated during conditions where exhaust gas is not generated.

Turning now to FIGS. 2A and 2B, they show a first cross-sectional view 210 and a second cross-sectional view 250, respectively, of a prechamber 204 of a main combustion chamber 202. The main combustion chamber 202 may be used similarly to the combustion chamber 30 of FIG. 1. Thus, the main combustion chamber 202 may be included in engine 10 of FIG. 1. An axes system of FIG. 2A includes an x-axis parallel to a horizontal direction and a y-axis parallel to a vertical direction. An axes system of FIG. 2B includes the x-axis and a z-axis parallel to a transverse direction and normal to the x-axis. A direction of gravity may be parallel to the y-axis of FIG. 2A.

Prechamber 204 may be arranged in each of a cylinder head region 201 and within an interior volume of the main combustion chamber 202. As illustrated, ignition device 292 may be arranged in a portion of prechamber 204 within the cylinder head. The prechamber 204 may be arranged between an intake valve and an exhaust valve.

Prechamber 204 may further include a plurality of openings 214. The plurality of openings 214 may fluidly couple an interior volume 218 of the prechamber 204 to the combustion chamber 202. A central opening 228 may be arranged along a central axis 290, wherein the central opening 228 may also fluidly couple the interior volume 218 to the combustion chamber 30. A prechamber wall 212 may fluidly separate the interior volume 218 from the combustion chamber 202. In this way, the plurality of openings 214 and the central opening 228 may be the only inlets and outlets of the prechamber 18 through which fluids may flow.

The plurality of openings 214 may be identically shaped and sized. In some examples, the plurality of openings 214 may be evenly distributed along a circumference of the prechamber 204, to promote even distribution of a flame jet or a combusted air-fuel mixture. Additionally or alternatively, the plurality of openings 214 may be arranged non-uniformly, wherein a greater density of openings of the plurality of openings 214 may be arranged along certain regions of the prechamber 204. For example, the plurality of openings 214 may be arranged such that fewer openings face toward the intake and/or the exhaust valves and more face regions of the combustion chamber 202 between the intake and exhaust valves.

The plurality of openings 214 may be cut-outs arranged in the prechamber wall 212. The plurality of openings 214 may be tangential relative to the prechamber wall 212, such that its cross-sectional flow-through area is tangential to inner and outer surfaces of the prechamber wall 212. Each opening of the plurality of openings 214 may be separated via sections of the prechamber wall 212. By doing this, each opening of the plurality of openings 214 may be fluidly separated from adjacent or any other of the plurality of openings 214.

The plurality of openings 214 may be shaped at an angle such that intake may be directed towards an upper region of prechamber 204 adjacent to the cylinder head 201 to facilitate the clearing of residual gases out of the prechamber 204 during an intake stroke. In one example, additionally or alternatively, the plurality of openings 214 may be shaped perpendicularly to the central axis 234 such that flow passing through the plurality of openings 214 may also be perpendicular to the central axis 234. In one example, additionally or alternatively, the plurality of openings 214 may be angled such that exhaust may be directed out of prechamber 204 towards the piston and away from the intake valves and the exhaust valves during an expansion stroke and/or an exhaust stroke, which may increase turbulence in a lower volume of the combustion chamber 30 to promote mixing and clearing of exhaust. The plurality of openings 214 may include a uniform area throughout a length thereof, facilitating flow in and out of prechamber 18. In some examples, additionally or alternatively, the plurality of openings 214 may include a constriction along a length thereof. The constriction may be arranged along a middle of the length of the plurality of openings 214 or it may be biased toward one of the combustion chamber 30 or the interior volume 218.

The plurality of openings 214 may extend from an inner surface of the prechamber wall 212 to an outer surface of the prechamber wall 212. The inner surface may face the interior volume 218 of the prechamber 204 and the outer surface may face the main combustion chamber 202. The plurality of openings 214 may extend in a direction angled to a thickness of the prechamber wall 212. As shown in FIG. 2B, the plurality of openings 214 may include a length greater than the thickness of the prechamber wall 212. In one example, the plurality of openings 214 may allow fluids to flow in a centripetal and a centrifugal direction in response to a position of a piston. A flow-through area of the plurality of openings 214 may be oriented tangentially to the prechamber wall 212.

The plurality of openings 214 may be shaped such that an angle α may be formed, as depicted in FIG. 2A, representing the angle the plurality of openings 214 makes with the central axis 290. The central axis 290 is also the axis along which a piston in combustion chamber 202 may oscillate. In one example, the angle α may be an obtuse angle. Further, the plurality of openings 214 may be shaped such that an angle β may be formed, as depicted in FIG. 2B, representing the angle the plurality of openings 214 makes with a horizontal diameter of the prechamber 204. The prechamber 204, as shown by the second cross-sectional view 250, has radial symmetry such that an equivalently representative diameter may be used to show the angle β for any of the openings 214 in rotational variations of the second cross-sectional view 250. In one example, the angle β may be an acute angle. It will be appreciated that the angle β and the opposite angle sharing the vertex are congruent, as they are vertical angles.

The central opening 228 may be located at a bottom portion of prechamber 204 such that the plurality of openings 214 are positioned above the central opening 228. More specifically, the central opening 228 may be arranged in a lowest portion of the prechamber 204 closest to a piston (e.g., piston 36 of FIG. 1). Thus, the plurality of openings 214 may be arranged along the prechamber 204 in a position closer to the cylinder head 201 than the central opening 228. The central opening 228 may be a single opening. In one example, additionally or alternatively, the central opening 228 may be a plurality of openings, distributed along the bottom portion of the prechamber 204. The central opening 228 may include a first portion 222 and a second portion 224. The first portion 222 may include a flow-through area that decreases in diameter in a direction towards the second portion 224. In one example, the first portion 222 includes a funnel or a cone shape, which may accelerate fluids flowing through the first portion 222 to the second portion 224. In one example, the flow-through area of the first portion 222 decreases at a linear rate. In one example, additionally or alternatively, the flow-through area of the first portion 222 decreases at a logarithmic rate. In yet another example, the flow-through area of the first portion 222 decreases at an exponential rate.

The second portion 224 may include a smaller flow-through area relative to the flow-through area of the first portion 222. Fluid flow through the second portion 224 may be accelerated relative to the fluid flow in the first portion 222. In one example, the shape of the second portion 224 may force fluid to flow through the second portion 224 in only a single direction along the central axis 290 to the main combustion chamber 202. As such, a combustion mixture in the main combustion chamber 202 may not enter the interior volume 218 of the prechamber 204 via the central opening 228. The shape of central opening 228 may facilitate a flow 236 from of the inside of prechamber 204 outside to combustion chamber 202, promoting expulsion of residual gases in between combustion events. By doing this, residual gases in the interior volume of prechamber 204 may be cleared therefrom. In one example, residual gases may exit prechamber 18 during an intake stroke via central opening 228 as described below.

An injector 232 may be positioned to directly inject fuel in to the combustion chamber 202. A fuel injection provided by the injector 232 may combine with fluids in combustion chamber 202, which may be forced into the interior volume of prechamber 204 via the plurality of openings 214 to be ignited via a spark provided by ignition device 92. In one example, ignition device 92 is a spark plug. In another example, the ignition device 92 may be a glow plug. The combusted mixture may then flow into the combustion chamber 202 and propagate therein.

Turning now to FIGS. 3A, 3B, and 3C, they show embodiments 300, 330, and 350, respectively, of the prechamber system 200.

The embodiment 300 of FIG. 3A shows a first flow 312 and a second flow 314 during an intake stroke. During the intake stroke, a piston in combustion chamber 306 may move downward, creating a partial vacuum that may draw in air and/or an air-fuel mixture to the combustion chamber 306. The mixture may include air from the atmosphere and fuel from injector 302. The mixture may enter the combustion chamber 306 via the intake valves 152. The intake valves 152 may include a first intake valve 320 and a second intake valve 322.

Operation of the intake valves 152 may be modified during the intake stroke in response to a likelihood of residual gas being present in the prechamber 304 being greater than a threshold likelihood. In one example, the prechamber 304 is identical to the prechamber 204 of FIGS. 2A and 2B except that the prechamber 304 is free of an injector. The operation of the intake valves 152 may be adjusted such that an intake mixture is forced to enter the combustion chamber 306 along a single hemisphere of the combustion chamber 306. This may impart a swirl to the intake mixture such that the intake mixture may flow in a clockwise or counterclockwise direction. In one example, a first flow 312 is generated by only opening the second intake valve 322 during a first portion of the intake stroke. By doing this, the first flow 312 may be counterclockwise, which may allow the intake mixture to more easily enter the prechamber 304, as illustrated via second flow 314.

In one example, if the plurality of openings 214 are arranged in an opposite orientation such that a clockwise swirl may more directly flow therethrough, then the intake valve operation may be adjusted to open the first intake valve 320 prior to the second intake valve 322.

In the example of FIG. 3A, the first intake valve 320 may be maintained closed for the entirety of the first portion of the intake stroke. In one example, the first portion may be a dynamic value, wherein a duration of the first portion may be proportional to the likelihood of residual gas being present in the prechamber. The duration of the first portion may increase in response to the likelihood of residual gas being present in the prechamber increasing, as one example. Once the first portion has elapsed, the first intake valve 320 may be opened such that each of the first and second intake valves 320, 322 are open and admitting the intake mixture to the combustion chamber 306.

The example of FIG. 3A illustrates where the direction of the first flow 312 is generated via adjusting an intake valve operation. However, in some examples, a swirl generator may be arranged in the intake port. The swirl generator may be activated (e.g., protrude into the intake port) and impart a swirl to the intake mixture.

The embodiment 330 of FIG. 3B shows a flow 332 during an expansion stroke. The flow 332 may flow in a clockwise direction, opposite to the first and second flows 312, 314 of FIG. 3A. The flow 332 may flow in a radially outward direction. In one example, due to the angle of the plurality of openings 214 relative to the axis along which the piston oscillates, the flow 332 may flow in a downward direction toward the piston. By doing this, during the expansion stroke, ignited air-fuel mixture may expand and push the piston in combustion chamber 30 downwards. The first intake valve 320, the second intake valve 322, the first exhaust valve 324, and the second exhaust valve 326 may be in a fully closed state during an entirety of the expansion stroke.

More specifically, an ignition device in the prechamber 304 may ignite an air/fuel mixture therein near TDC during a transition between a compression stroke and the expansion stroke. The air/fuel mixture may be ignited, which may result in flame jets being expelled from the plurality of openings 214 and a central opening (e.g., central opening 228 of FIG. 2A). The shape of the plurality of openings 214 and the central opening may promote ignition of a compressed air/fuel mixture within the combustion chamber 306. The plurality of openings 214 may be angled downward, as described above, and direct the flame jets to radially outer portions of the piston. By doing this, a greater portion of the compressed air/fuel mixture may be combusted, resulting in reduced emissions and increased power output.

The embodiment 350 of FIG. 3C shows a flow 352 during an exhaust stroke. The flow 352 may flow in a clockwise direction, similar to the flow 332 during the expansion stroke. During the exhaust stroke, the piston in combustion chamber 30 moves upwards, and combustion gases generated during the expansion stroke may flow out of combustion chamber 30 via the first exhaust valve 324 and the second exhaust valve 326 being moved to open positions. The first exhaust valve 324 and the second exhaust valve 326 may enter a fully open state in the exhaust stroke.

The clockwise flow 352 in the combustion chamber 30 may be a continuation of flow 332 of FIG. 3B. During the exhaust stroke, the shape and positioning of the plurality of openings and the bottom central opening of prechamber 18 may reduce an amount of fluids in flow 352 from entering the prechamber 18. This may be due to the clockwise flow mismatching with the orientation of the plurality of openings 214. By doing this, little to no residual gas may be in the prechamber 304 during a subsequent intake stroke.

The plurality of openings of prechamber 18 may be mirrored such that the flows may also be mirrored during the combustion cycle. In one example, the opening profile of the first intake valve 320 and the second intake valve 322 may promote clockwise flow by opening the first intake valve 320 before the second intake valve 322. In one example, mirrored openings in the prechamber 18 may promote counterclockwise flow for flow 332 and flow 352 during expansion and exhaust strokes respectively.

Turning now to FIG. 4, it shows a method 400 for adjusting intake valve operation based on residual gases being present in a prechamber. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 400 begins at 401, which includes determining if the engine is combusting. The engine may be combusting if the engine is being fueled and receiving spark.

If the engine is not combusting, the method 400 may proceed to 402, which includes not fueling the engine. Intake valve operation may not be adjusted.

If the engine is combusting, the method 400 may proceed to 403, which includes determining if a likelihood of residual gases being present in the combustion chamber is greater than a threshold likelihood. The threshold likelihood may be based on one or more of an exhaust gas mass flow, a spark timing, an injection timing, and the like. For example, if the exhaust gas mass flow is lower than an expected exhaust gas mass flow, then a likelihood of residual gases being present in the prechamber may increase. The exhaust gas mass flow may be sensed via an exhaust gas sensor, such as exhaust gas sensor 126 of FIG. 1, and the expected exhaust gas mass flow may be based on an amount of intake mixture and fuel provided during a combustion cycle. As another example, if the spark timing or injection timing is advanced, then the likelihood of residual gases being present may increase.

If the likelihood of residual gases being present in the combustion chamber is not greater than the threshold likelihood (e.g., less than or equal to the threshold likelihood), the method 400 may proceed to 404, which includes maintaining current operating parameters. The intake valve operation may not be adjusted based on residual gases during the engine combustion. If the likelihood of residual gases being present in the combustion chamber is greater than the threshold likelihood, the method 400 may proceed to 406, which includes determining if an intake stroke is occurring. An intake stroke may be occurring when the crank angle is between 0° and 180°, wherein the crank angle may be based on feedback from the Hall effect sensor 118 of FIG. 1.

If an intake stroke is not occurring, the method 400 may proceed to 407, which includes maintaining the intake valves closed. A stroke other than the intake stroke may be occurring, in which case it may be desired to maintain the intake valves closed to block a combustion mixture from exiting the combustion chamber and entering an intake system.

If an intake stroke is occurring, the method 400 may proceed to 408, which includes opening a second intake valve.

The method 400 may proceed to 410, which includes maintaining a first intake valve closed. By doing this, an intake mixture may flow into the combustion chamber via only the second intake valve, which may result in a swirl flow pattern within the combustion chamber. The swirl flow pattern may match an orientation of a plurality of openings of the prechamber of the combustion chamber, such that the intake mixture may flow through the plurality of openings and into an interior volume of the prechamber.

The method 400 may proceed to 412, which includes determining if a piston position is past a threshold position. The threshold position may be based on the likelihood of residual gas being present. For example, as the likelihood increases, then an estimate of an amount of residual gas present may also increase, which may result in the threshold position being adjusted to increase a duration in which the first intake valve is closed.

If the piston position is not past the threshold position, the method 400 may proceed to 414, which includes continuing to monitor the piston position and maintain the first intake valve closed.

If the piston position is past the threshold position, the method 400 may proceed to 416, which includes opening the first intake valve. In this way, each of the first and second intake valves may be fully opened and an intake mixture may flow therethrough.

Turning now to FIG. 5, it shows a plot 500 graphically illustrating an engine cycle executed via the method 400 of FIG. 4. Plot 510 illustrates a piston position. Plot 520 illustrates a first intake valve position. Plot 530 illustrates a second intake valve position. Plot 540 illustrates a direction of fluid flow within the combustion chamber. Time is plotted along the abscissa and increases from a left to a right side of the figure.

Prior to t1, an intake stroke is occurring. The piston begins the intake stroke at TDC and moves towards BDC as the intake stroke progresses (plot 510). During the intake stroke, the first and second intake valves are moved to open positions (plots 520 and 530, respectively). In the example of FIG. 5, the second intake valve is opened prior to the first intake valve, resulting in a counterclockwise direction of fluid flow. The first intake valve is opened later in the intake stroke once the counterclockwise direction of fluid flow is established.

At t1, the piston position is equal to a BDC position, indicating a transition between the intake stroke and a compression stroke. Between t1 and t2, the compression stroke occurs. The piston begins the compression stroke at BDC and moves towards TDC as the compression stroke progresses. The first intake valve and the second intake valve are actuated to fully closed positions at a start of the compression stroke. The counterclockwise fluid flow generated during the intake stroke may be maintained during the compression stroke. As such, fluids may continue to flow into a prechamber via a plurality of openings, which may promote residual gas expulsion therefrom.

At t2, the piston moves to TDC, indicating a transition between the compression stroke and a power stroke. Between t2 and t3, the power stroke occurs. The piston begins the power stroke at TDC and moves towards BDC as the power stroke progresses as a result of the ignited fluids in the combustion chamber. As such, an ignition device of the prechamber may provide a spark at a start of the power stroke (e.g., at TDC) or slightly before the start of the power stroke. By doing this, the fluids in the prechamber may combust, resulting in flame jets escaping the prechamber via the plurality of openings and igniting combustion mixture within the combustion chamber. The direction of fluid flow is switched from counterclockwise to clockwise as fluids are now leaving the prechamber as opposed to entering the prechamber as a result of the directionality of the openings of the prechamber.

At t3, the piston moves to BDC, indicating a transition between the power stroke and an exhaust stroke. Between t3 and t4, the exhaust stroke occurs. The piston begins the exhaust stroke at BDC and moves towards TDC as the exhaust stroke progresses. The combustion fluids flows in the clockwise direction throughout the exhaust stroke as a continuation of the flow from the power stroke as exhaust may be expelled from the combustion chamber. Furthermore, the clockwise flow may reduce an amount of residual gas present in the prechamber during a subsequent intake stroke.

At t4, the piston reaches TDC, indicating a transition between the exhaust stroke and an intake stroke. After t4, the intake stroke begins as the engine starts another combustion cycle. Due to the flow direction during the previous power and exhaust strokes, the residual gas present in the prechamber may be relatively low. As such, during the intake stroke following t4, the first intake valve may be opened sooner than in the example prior to t1.

In this way, an engine system may include a prechamber configured to facilitate intake flow into the prechamber while expelling residual gas from the prechamber. A plurality of openings of the prechamber may fluidly couple an interior volume of the prechamber to a volume of a main combustion chamber. A central opening may further fluidly couple the interior volume of the prechamber to the volume of the main combustion chamber. A swirling flow may be generated around the prechamber during various strokes of a combustion cycle.

The technical effect of the plurality of openings of the prechamber is to introduce intake flow into the prechamber during an intake stroke, promoting expulsion of residual gases in the prechamber, thereby enhancing combustion conditions. The technical effect of the central opening is to further promote expulsion of fluids (e.g., residual gases or a combustion mixture), thereby enhancing future combustion conditions. The technical effect of the directionality of the swirling flow around the prechamber is to promote or reduce flow into the prechamber during various strokes of a combustion cycle, thereby further enhancing combustion conditions.

An embodiment of a system comprises a prechamber arranged in a main combustion chamber, wherein the prechamber comprises a plurality of openings angled to each of a central axis of the prechamber and a radius of the prechamber. A first example of the system further includes where a length of each of the plurality of openings is greater than a thickness of a prechamber wall through which the plurality of openings extends. A second example of the system, optionally including the first example, further includes where a piston is configured to oscillate within the main combustion chamber along the central axis. A third example of the system, optionally including one or more of the previous examples, further includes where the plurality of openings is arranged along a portion of the prechamber closer to a cylinder head than a central opening of the prechamber. A fourth example of the system, optionally including one or more of the previous examples, further includes where the central opening comprises a first portion and a second portion, wherein the first portion comprises a funnel shape and the second portion corresponds to a restriction of the central opening. A fifth example of the system, optionally including one or more of the previous examples, further includes where the central opening is shaped to only expel fluids from an interior volume of the prechamber to the main combustion chamber. A sixth example of the system, optionally including one or more of the previous examples, further includes where the plurality of openings is oriented to receive fluids in a counterclockwise direction and expel fluids in a clockwise direction. A seventh example of the system, optionally including one or more of the previous examples, further includes where plurality of openings is oriented to expel fluids to an outer diameter of a piston.

An embodiment of an engine system comprises a prechamber arranged in a main combustion chamber, wherein the prechamber comprises a plurality of openings transversely arranged in a prechamber wall, and a controller with computer-readable instruction stored on non-transitory memory thereof that when executed enable the controller to adjust a timing of at least one intake valve during an intake stroke in response to residual gases. A first example of the engine system further includes where the instructions further enable the controller to delay an opening of the at least one intake valve relative to an opening of an at least another intake valve. A second example of the engine system, optionally including the first example, further includes where the instructions further enable the controller to increase the delay in response to an amount of residual gases present in the prechamber increasing. A third example of the engine system, optionally including one or more of the previous examples, further includes where the prechamber further comprises a central opening arranged closer to a piston than the plurality of openings. A fourth example of the engine system, optionally including one or more of the previous examples, further includes where the central opening is a single opening arranged in a lowermost portion of the prechamber. A fifth example of the engine system, optionally including one or more of the previous examples, further includes where the central opening comprises a constriction. A sixth example of the engine system, optionally including one or more of the previous examples, further includes where a cross-sectional flow-through area of the plurality of openings is uniform.

An embodiment of a system comprises a prechamber arranged in a main combustion chamber, wherein the prechamber comprises a plurality of openings transversely arranged in a prechamber wall and a central opening arranged in a lower portion of the prechamber wall. A first example of the system further includes where the plurality of openings comprises a uniform flow-through area and where the central opening comprises a narrowing flow-through area, wherein the narrowing flow-through area narrows from an interior volume of the prechamber to a volume of the main combustion chamber. A second example of the system, optionally including the first example, further includes where the central opening directs fluid flow in a direction parallel to an axis along which a piston oscillates. A third example of the system, optionally including one or more of the previous examples, further includes where the plurality of openings direct fluid flow in a direction angled to each of the axis and a thickness of the prechamber wall. A fourth example of the system, optionally including one or more of the previous examples, further includes where the prechamber comprises no other inlets or additional outlets other than the plurality of openings and the central opening.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    a prechamber arranged in a main combustion chamber, wherein the prechamber comprises a plurality of openings angled to each of a central axis of the prechamber and a radius of the prechamber, wherein the prechamber is free of an injector; and
    an ignition device positioned in the prechamber, wherein the ignition device does not overlap with the central axis.

2. The system of claim 1, wherein a length of each of the plurality of openings is greater than a thickness of a prechamber wall through which the plurality of openings extends.

3. The system of claim 1, wherein a piston is configured to oscillate within the main combustion chamber along the central axis.

4. The system of claim 1, wherein the plurality of openings is arranged along a portion of the prechamber closer to a cylinder head than a central opening of the prechamber.

5. The system of claim 4, wherein the central opening comprises a first portion and a second portion, wherein the first portion comprises a funnel shape and the second portion corresponds to a restriction of the central opening.

6. The system of claim 4, wherein the central opening is shaped to only expel fluids from an interior volume of the prechamber to the main combustion chamber.

7. The system of claim 1, wherein the plurality of openings is oriented to receive fluids in a counterclockwise direction and expel fluids in a clockwise direction.

8. The system of claim 1, wherein plurality of openings is oriented to expel fluids to an outer diameter of a piston.

9. An engine system, comprising:
a prechamber arranged in a main combustion chamber, wherein the prechamber comprises a plurality of openings transversely arranged in a prechamber wall;
an injector positioned to inject fuel outside of the prechamber; and
a controller with computer-readable instruction stored on non-transitory memory thereof that when executed enable the controller to:
adjust a timing of at least one intake valve relative to a timing of at least another intake valve of the main combustion chamber during an intake stroke in response to residual gases.

10. The engine system of claim 9, wherein the instructions further enable the controller to delay an opening of the at least one intake valve relative to an opening of the at least another intake valve.

11. The engine system of claim 10, wherein the instructions further enable the controller to increase the delay in response to an amount of residual gases present in the prechamber increasing.

12. The engine system of claim 9, wherein the prechamber further comprises a central opening arranged closer to a piston than the plurality of openings.

13. The engine system of claim 12, wherein the central opening is a single opening arranged in a lowermost portion of the prechamber.

14. The engine system of claim 12, wherein the central opening comprises a constriction.

15. The engine system of claim 9, wherein a cross-sectional flow-through area of the plurality of openings is uniform.

16. A system, comprising:
a prechamber, free of an injector, arranged in a main combustion chamber, wherein the prechamber comprises a plurality of openings transversely arranged in a prechamber wall and a central opening arranged in a lower portion of the prechamber wall; and
an ignition device positioned in the prechamber, wherein the ignition device does not overlap with a central axis of the central opening.

17. The system of claim 16, wherein the plurality of openings comprises a uniform flow-through area and where the central opening comprises a narrowing flow-through area, wherein the narrowing flow-through area narrows from an interior volume of the prechamber to a volume of the main combustion chamber.

18. The system of claim 16, wherein the central opening directs fluid flow in a direction parallel to an axis along which a piston oscillates.

19. The system of claim 18, wherein the plurality of openings direct fluid flow in a direction angled to each of the axis and a thickness of the prechamber wall.

20. The system of claim 16, wherein the prechamber comprises no other inlets or additional outlets other than the plurality of openings and the central opening.

* * * * *